US005905516A

United States Patent [19]
Kagayama

[11] Patent Number: 5,905,516
[45] **Date of Patent: *May 18, 1999**

[54] IMAGE FORMING APPARATUS HAVING AT LEAST ONE REINFORCING MEMBER

[75] Inventor: Shigeru Kagayama, Owariasahi, Japan

[73] Assignee: Brother Kogyo Kabushiki Kaisha, Nagoya, Japan

[ * ] Notice: This patent is subject to a terminal disclaimer.

[21] Appl. No.: 08/637,379

[22] Filed: Apr. 24, 1996

[30] Foreign Application Priority Data

Apr. 25, 1995 [JP] Japan .................................... 7-100813
Apr. 25, 1995 [JP] Japan .................................... 7-100818

[51] Int. Cl.[6] ................................ B41J 2/06; B41J 2/385; G01D 15/06

[52] U.S. Cl. ............................. 347/55; 347/141; 347/142

[58] Field of Search .............................. 347/55, 141, 112

[56] References Cited

U.S. PATENT DOCUMENTS

| | | | |
|---|---|---|---|
| 5,404,155 | 4/1995 | Kitamura | 347/55 |
| 5,481,286 | 1/1996 | Kagayama | 347/55 |
| 5,495,273 | 2/1996 | Kitamura | 347/55 |
| 5,497,175 | 3/1996 | Maeda | 347/55 |
| 5,504,509 | 4/1996 | Kagayama | 347/55 |
| 5,523,777 | 6/1996 | Kitamura | 347/55 |
| 5,539,438 | 7/1996 | Maeda | 347/55 |
| 5,631,679 | 5/1997 | Kagayama | 347/55 |
| 5,650,809 | 7/1997 | Kitamura | 347/55 |
| 5,659,344 | 8/1997 | Kagayama | 347/55 |

FOREIGN PATENT DOCUMENTS

| | | | |
|---|---|---|---|
| 0 587 366 A1 | 3/1994 | European Pat. Off. . | |
| 07-009-692 | 1/1995 | Japan | B41J 2/385 |
| 7-9692 | 1/1995 | Japan . | |

*Primary Examiner*—Peter S. Wong
*Assistant Examiner*—Bao Q. Vu
*Attorney, Agent, or Firm*—Oliff & Berridge, PLC

[57] ABSTRACT

An aperture electrode body of an image forming apparatus according to the invention comprises an insulating sheet made of polyimide as a base material and having a number of apertures and control electrodes for controlling a flow of toner. Reinforcing resin sheets made of polyimide are integrally affixed on both upper and lower surfaces of the insulating sheet. Since the aperture electrode body is prevented from warping due to the difference in characteristics of their materials, a uniform contact state with a toner carrying roller is obtained to thereby control a flow of toner in a stable manner.

28 Claims, 12 Drawing Sheets

IMAGE FORMING APPARATUS HAVING AT LEAST ONE REINFORCING MEMBER

BACKGROUND OF THE INVENTION

1. Field of the Invention

The invention relates to an image forming apparatus used in a copier, printer or facsimile machine.

2. Description of Related Art

A conventional image forming apparatus is disclosed in EP 587,366 (JP-A-6-155798), where an aperture electrode is arranged to contact a toner supply device, such as a toner carrying roller. Contact is through a toner layer to provide the aperture electrode with a low voltage.

The EP 587,366 image forming apparatus is constructed as shown in FIG. 11. A toner carrying roller 114 opposes a sheet of paper 120 through an aperture electrode body 101. A back electrode roller 122 is provided on the back of the sheet 120. In the image forming apparatus, as shown in FIG. 12, a plurality of openings or apertures 106, each having a suitable diameter such as approximately 100 μm, are formed in one surface of an insulating sheet 102. The sheet 102 is formed of polyimide with a thickness of approximately 25 μm. The apertures 106 are formed in a row extending lengthwise of the aperture electrode body 101. A control electrode 104, formed of a suitable material such as copper foil, has a thickness of approximately 8 μm and width of approximately 20 μm, and is positioned around each of the apertures 106. The aperture electrode body 101 is arranged with a surface opposed to the paper 120. A control voltage, corresponding to an image signal from a control voltage applying circuit 108, is applied to the control electrode 104. A voltage is applied from a DC source 124 to the back electrode roller 122 to control the jumping of toner 116 from the toner carrying roller 114 to form an image on the paper 120.

A control electric field for the control electrode 104 is generated between the control electrode 104 and the interior of the aperture 106, and between the aperture 106 and a toner carrying surface of the toner carrying roller 114, which is opposed to the aperture 106. Since the control electric field can be directly applied to the toner 116, excellent control can be obtained. Further, some of the toner 116 receives a mechanical or similar motive force resulting from the contact with the aperture electrode body 101. Even if the toner 116 is moved into an aperture 106 corresponding to a non-image portion, the toner 116 is controlled by the electric field so it does not pass through the aperture 106. Thus, excellent toner control can be obtained. It is therefore possible to obtain a high quality image. Since the toner carrying roller 114 is opposed to the aperture electrode body 101 and separated by a toner layer, the apertures can be positioned relatively close to each other, and a flow of toner can be accurately controlled, even with a low control voltage. Accordingly, the device is inexpensive with high reliability, without requiring expensive controlling drive elements. However, on the other hand, the following problems are evident in the conventional image forming apparatus.

In the conventional image forming apparatus, the aperture electrode body is in contact with the toner layer carried by the carrying roller. The toner particles in contact therewith are rolled on the carrying roller, whereby an adhesive force of the toner particles on the carrying roller is reduced. Thus, the toner particles are easily separated from the carrying roller making it possible to smoothly control the flow toner passing through the aperture. However, to effectively control the flow by a low voltage drive, it is advantageous that the aperture electrode body thickness be reduced.

However, when the aperture electrode body thickness is reduced, creases or deformation may occur in the vicinity of the aperture. Accordingly, it is difficult to maintain a uniform contact between the aperture electrode body and the toner carrying roller. Thus, a stabilized flow of toner is not possible, and it is difficult to obtain an image of high quality, with even printing.

An arrangement with an aperture electrode body having a reduced thickness is known. A moderate tension can be applied to the aperture electrode body, which is pressed against a toner carrying roller. However, with a smaller apparatus, a width or direction perpendicular to the row of the apertures in the aperture electrode body becomes short, making it difficult to mount the aperture electrode body within the apparatus.

For overcoming the above problems, JP-A-7-9692 discloses an apparatus, which is shown in FIG. 13A. A holding member 207 formed of, for example, polyethylene terephthalate (PET) resin or a ceramic material, is affixed to and reinforced by the surface of an insulating sheet 202 of an aperture electrode body 201 on the side provided with a control electrode 204. This does not produce creases or deformation in the vicinity of an aperture 206. Even if the width of the aperture electrode body 201 is small, a moderate tension generates a stable flow of toner.

However, since the aperture electrode body 201 of the image forming apparatus is reinforced by affixing a film, such as a PET film with an appropriate thickness of, for example 50 μm, on one surface of the insulating film, which is formed from a very thin resin film made polyimide, for example about 25 μm, a problem may arise when the films are affixed using a heat sensitive or a hot melt adhesive, such as a pressure sensitive hot melt adhesive. The aperture electrode body may become warped so as to be greatly curved or rolled in on the PET side, due to different thermal expansion coefficients. Even if the aperture electrode body is mounted in a warp-corrected state, a partial strain remains. Therefore, it becomes difficult to define contact with a toner carrying roller, i.e. a charged particle carrier and it is difficult to obtain an excellent image quality.

Further, as shown in FIG. 13B, the JP-A-7-9692 holding member 207 is formed also on the control electrode 204. In the image forming apparatus, a control voltage corresponding to an image signal is applied to the control electrode 204 from a control voltage applying circuit 108. A jumping voltage is applied from the DC power source 124 to the back electrode roller 122 for controlling the jumping of the toner 116 carried by the toner carrying roller 114. Thus an image can be formed on the paper 120. A holding member 207 on the control electrode 204 can affect an electric field generated between the control electrode 204 and the back electrode roller 122, to adversely affect a toner flow control by the aperture electrode body 201.

Further, the aperture electrode body 201 is constructed by forming an aperture 206 after the holding member 207 is joined to the insulating sheet 202, which is provided with the control electrode 204. However, it is very difficult to bore the aperture 206 at a suitable position in the center of the control electrode 204 with the control electrode 204 interposed between the insulating sheet 202 and the holding member 207. There was a very high possibility that the control electrode 204 will be scratched and consequently cause deteriorated printing quality when an aperture 206 is bored.

Moreover, since copper wiring is provided on only one surface of the aperture electrode body 201 for leads, the copper wiring becomes rounded or greatly bent when etching to form the wiring. When a warp, deformation or creases occur in the aperture electrode, it is difficult for the aperture electrode body 201 to contact the toner carrying roller 122. This leads to a disturbance, such as lateral irregularity of an output age, and greatly affects printing.

Further, when the deformation or creases occur in the aperture electrode body 201, it is difficult to process apertures in the aperture electrode body 201 or mount the drive IC. That is, the accuracy of locating apertures becomes poor or the mounting of the drive IC becomes difficult, due to the deformed creases.

SUMMARY OF THE INVENTION

The invention has been developed to solve the problems noted above. An object of the invention is to provide an image forming apparatus that can uniformly maintain contact between electric field control means and a charged particle carrier for stably controlling a flow of charged particles.

For achieving the above object, the forming apparatus according to the invention comprises a charged particle carrier for carrying charged particles and electric field control means provided with a plurality of apertures for controlling, by an electric field, a flow of charged particles supplied by the charged particle carrier. In particular, at least one reinforcing member is joined to one or both surfaces of the electric field control means, except in the vicinity of the apertures.

Electric field control means includes an insulating sheet, control electrodes provided on one surface of the insulating sheet, a plurality of apertures corresponding to the respective control electrodes, and a reinforcing member with portions exposed to the periphery of the plurality of apertures, when joined to the electrode control means. The portions of the reinforcing member can be in the form of slits. The reinforcing members are joined to a surface of the insulating sheet of the electric field control means on which the control electrode is formed on an opposite surface, or both surfaces thereof, except at the periphery of the plurality of apertures.

The invention is further characterized in that the reinforcing member has a thermal expansion coefficient substantially equal to that of the electric field control means. The reinforcing member is adhered to the electric field control means with a heat sensitive adhesive. Alternatively, a reinforcing member formed of the same material can be adhered thereto.

Further, the image forming apparatus according to the invention comprises electric field control means formed with a plurality of apertures where each aperture comprises a control electrode, charged particle supply means for supplying charged particles to the apertures of the electric field control means, and control electrode driving means for independently controlling the control electrodes to selectively jump the charged particles through the apertures of the electric field control means, from the charge particle supply means onto a recording means. A surface of the electric field control means opposite to a surface provided with a plurality of control electrodes of the electric field control means, comprises auxiliary members of similar thickness and material as the control electrodes, except at the periphery of the plurality of apertures.

Moreover, the strength of the electric field control means can be reinforced by reinforcing members, which are joined to the electric control means after the apertures have been formed. Thus, the control electrodes are not scratched when the apertures are bored.

Further, where the reinforcing members are joined to the electric field control means from both surfaces, they are affixed with a heat sensitive adhesive. Therefore, it is possible to minimize warping produced by different characteristics of the materials, in particular, different thermal expansion coefficients. Accordingly, it is possible to maintain contact between the electric field control means and the charged particle carrier. Further, they can be placed in contact widthwise under similar conditions. Therefore, a flow of charged particles is uniform and smooth, to enable a good image without a print irregularity.

Further, the electric field control means, provided with a plurality of apertures for controlling a flow of charged toner particles, has the reinforcing members, except in the vicinity of the apertures. Therefore, the flow of charged toner particles is not impeded by the reinforcing members.

The reinforcing members have a thermal expansion coefficient substantially equal to that of the electric field control means or the reinforcing members, which are formed of a similar or same material and adhered to the electric field control means with a heat sensitive adhesive. Therefore, good contact and sufficient bonding strength are attained, and neither partial strain and warp does not occur. Accordingly, it is possible to maintain a uniform contact between the electric field control means and the charged particle carrier. Accordingly, the flow of charged particles can be stably controlled. This enables printing of an extremely high quality image.

Moreover, the surface, opposite to the surface provided with a plurality of control electrodes in the electric field control means, comprises auxiliary members of the same thickness and the same material as the control electrodes. The auxiliary members are located on the control electrodes except at the periphery of the plurality of apertures. Accordingly, it is possible to increase the rigidity of the electric field control means and minimize deformation creasing in the electric field control means. Therefore, an improved image quality output to the recording medium can be achieved.

BRIEF DESCRIPTION OF THE DRAWINGS

Preferred embodiments of the invention will be described in detail with reference to the following figures wherein.

DESCRIPTION OF THE PREFERRED EMBODIMENTS

The first preferred embodiment of the invention will be described hereinafter with reference to the drawings.

Figure 1:
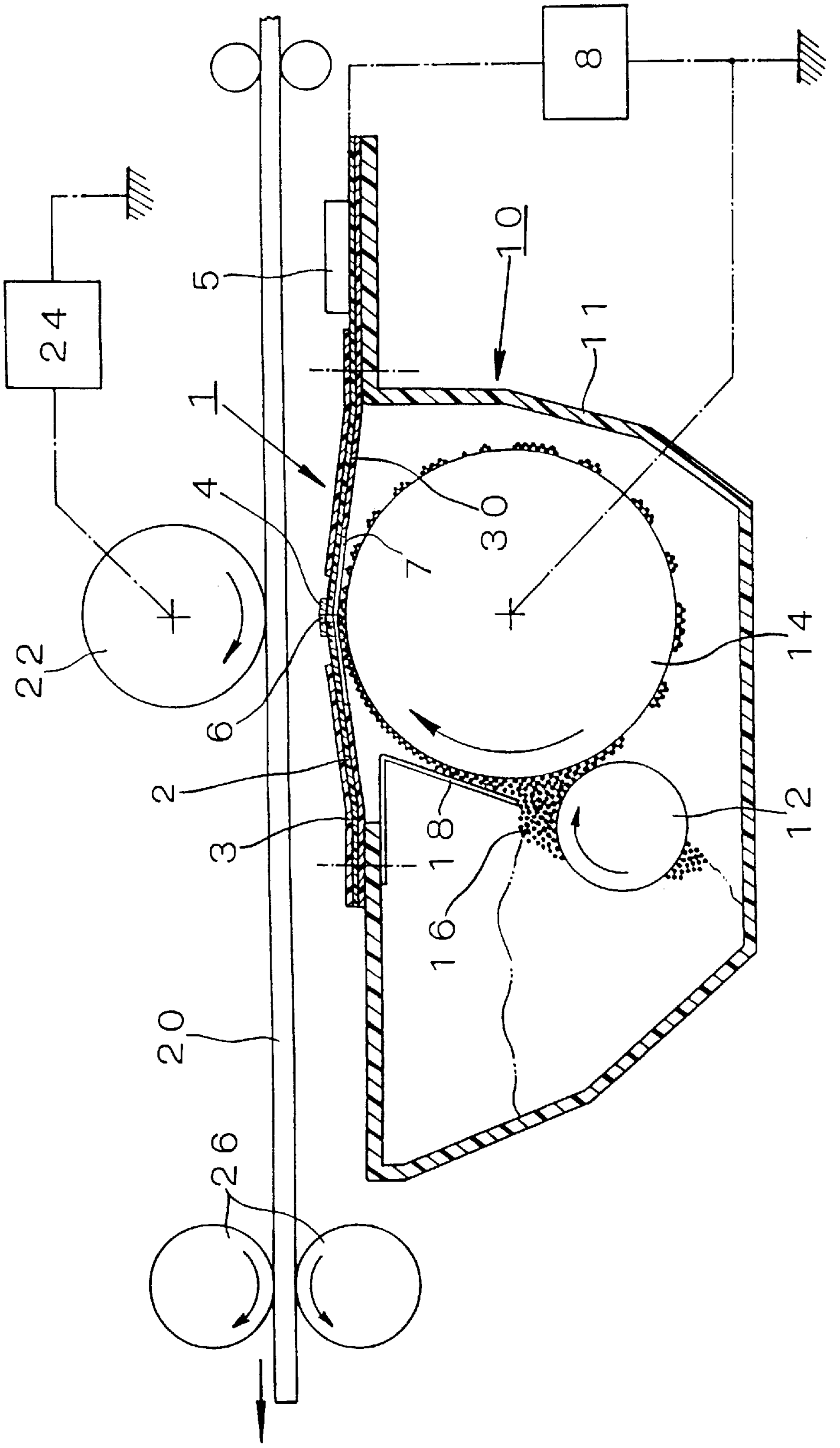
FIG. 1 is a schematic structural illustration showing a first preferred embodiment of an image forming apparatus according to the invention.
Figure 2:
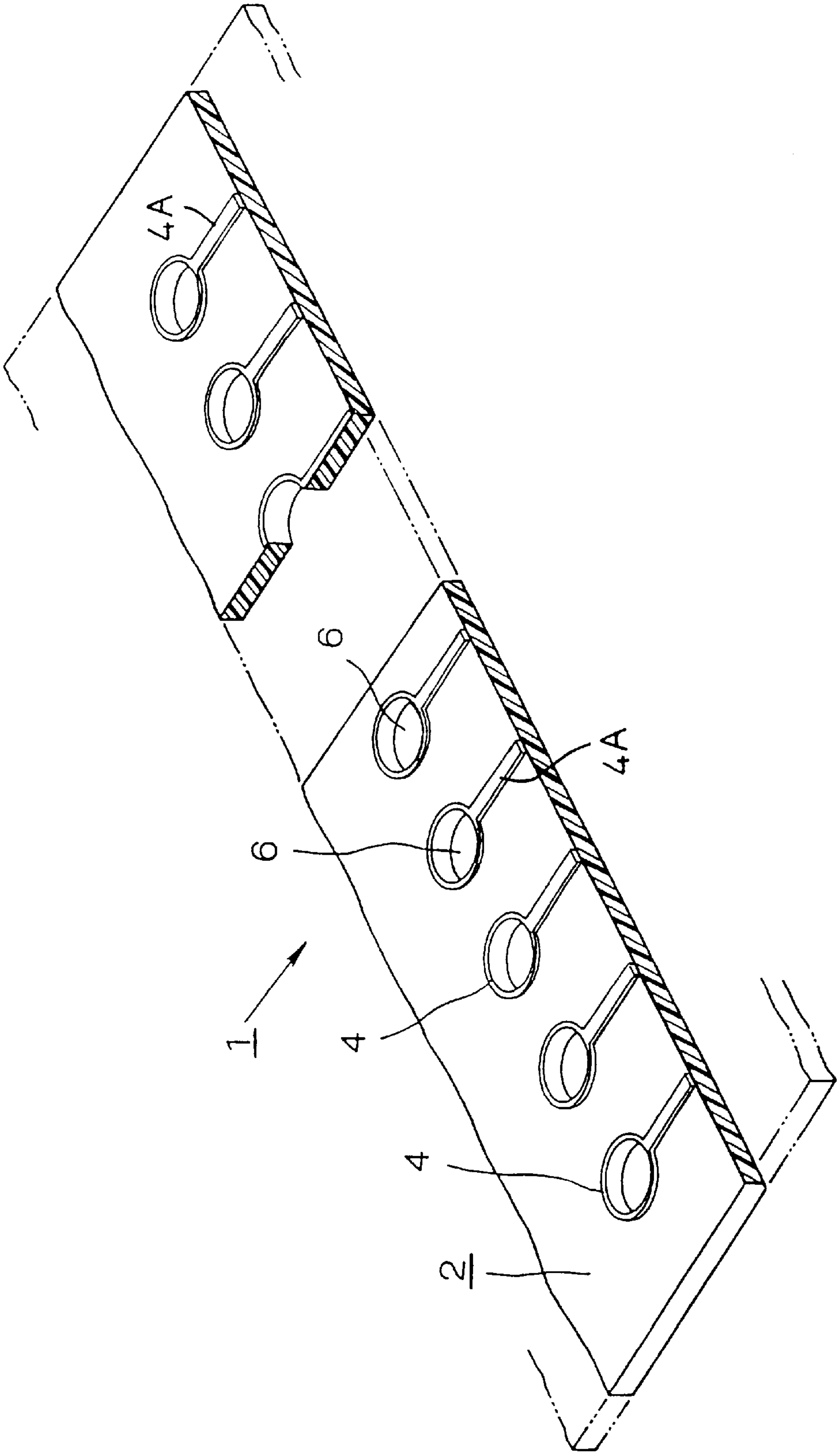
FIG. 2 is an enlarged perspective illustration showing the area around apertures of an aperture electrode body of the first preferred embodiment of electric field control means.
Figure 3:
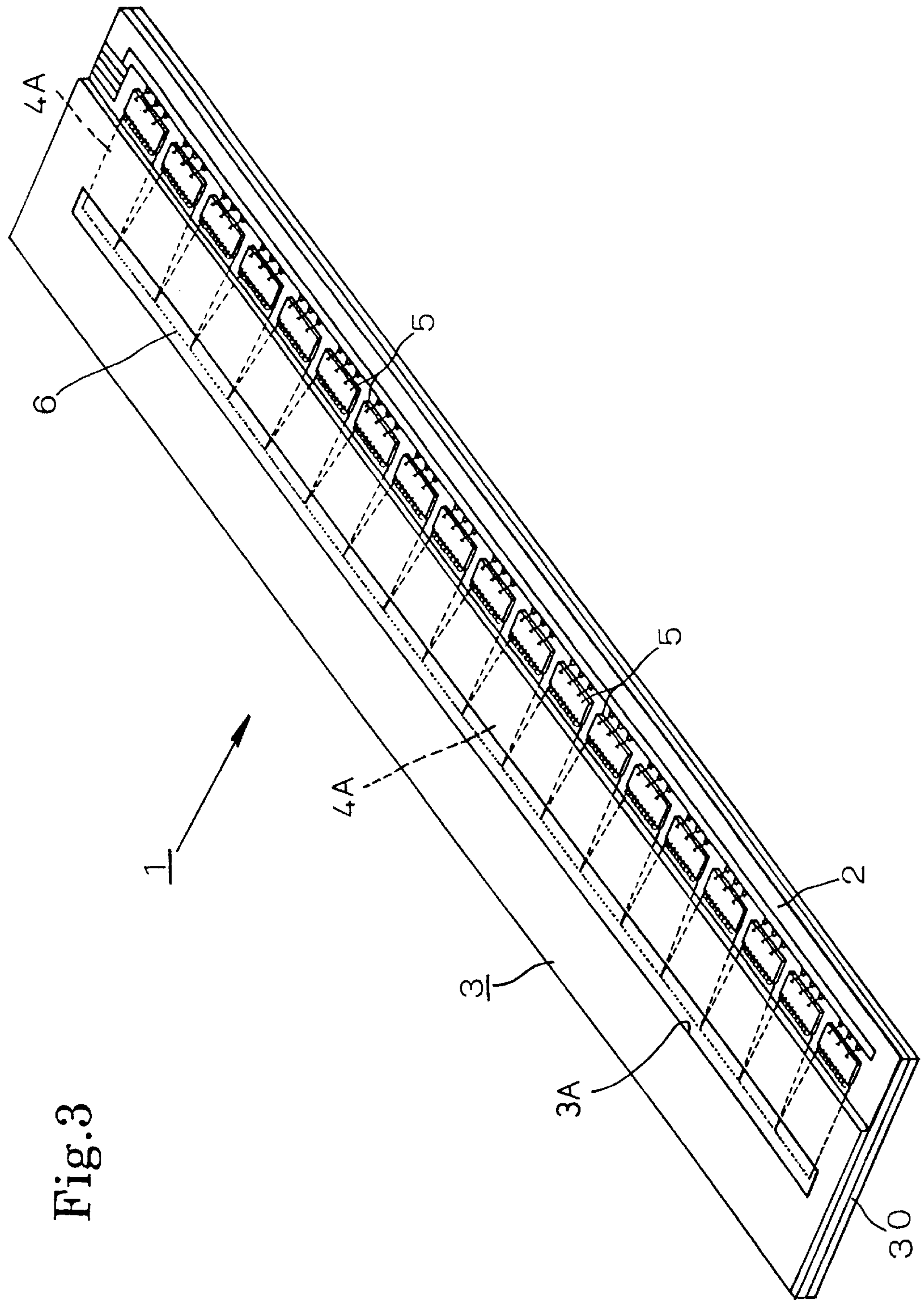
FIG. 3 is a perspective view illustrating the entirety of the aperture electrode body according to the first preferred embodiment of the invention.

FIG. 1 is a schematic structural view illustrating a first preferred embodiment of an image forming apparatus. The image forming apparatus comprises a back electrode roller 22 rotatably disposed on a chassis (not shown) with a suitable clearance, for example, of 1 mm above an aperture electrode body 1, which functions as electric field control means or toner flow control means. A recording medium 20 is inserted into a clearance between the back electrode roller 22 and transported thereunder. A toner supply device 10 is disposed lengthwise along and below the aperture electrode body 1. A heat fixing device 26, which comprises a heating roller and pressing roller, is disposed at a forward position for the recording medium 20.

A toner supply device 10 comprises a toner casing 11 for housing for the apparatus and toner. Insulating toner 16 is preferably contained in the toner casing 11. A supply roller 12, a toner carrying roller 14, which functions as a charged particle carrier, and a toner layer regulating blade 18 are contained within the toner casing 11. The toner carrying roller 14 is a metal roller having a suitable diameter, for example, of about 20 mm. Alternatively, the toner carrying roller 14 is a high polymer molecule resin roller such as rubber, in which the toner 16 is carried on a toner carrying surface of the outer peripheral surface, and transported toward the aperture electrode body 1. The supply roller 12 provides toner 16 to the toner carrying roller 14.

The supply roller 12 and the toner carrying roller 14 are supported on the toner casing 11 and rotate in the direction of the arrows in FIG. 1. Both elements are disposed parallel to each other and in contact with each other. A toner layer regulating blade 18 regulates the amount of the toner 16 carried on the toner carrying roller 14 so the toner 16 is uniform on the surface of the roller 14. Thus, the toner 16 can be uniformly charged to a predetermined polarity, for example, a negative polarity. The blade 18 is mounted on the toner casing 11 and presses against the toner carrying roller 14.

As shown in detail in FIGS. 2–4 and 14, the aperture electrode body 1 comprises a base material insulating sheet 2. The insulating sheet 2 is preferably formed from a high polymer molecule resin film that has excellent insulating properties and a suitable thickness, for example, of about 25 μm. Preferably, the resin film is a polyimide having excellent heat resistant and mechanical properties. The apertures 6 each preferably have a suitable diameter, for example, 100 μm, formed in a row lengthwise thereof in a direction substantially perpendicular to the transporting direction of the recording medium 20.

A number of control electrodes 4 each having a suitable thickness, for example, 8 μm, are formed on the upper surface of the insulating sheet 2 and encircle each aperture 6. Lead wire portions 4A connect each control electrode 4 to a driving IC 5 for applying a control voltage to the control electrode 4. The electrodes 4 and lead wires 4A are formed from a metal film, such as copper or gold. The polyimide resin film used for the insulating sheet 2, can be a known polyimide, for example, include EUPYREX (Ube Industries, Ltd.), KAPTON (TORAY DUPON INDUSTRIES, INC.), ESPANEX (Nippon Steel Chemical Co., Ltd.), NEOFLEX (Mitsui Toatsu Chemicals, Inc.).

Figure 14:
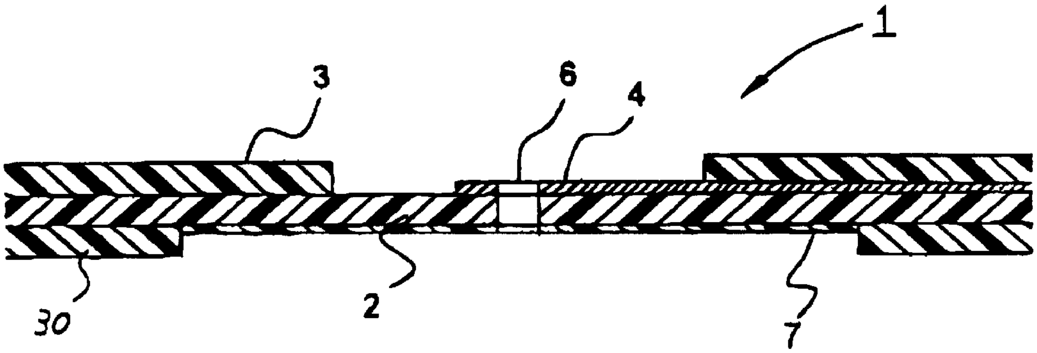
FIG. 14 is an enlarged sectional view illustrating the aperture electrode body shown in FIG. 1.

As shown in FIGS. 1 and 14, coating layers 7 having a suitable thickness, for example about 5 μm, are formed in the lower surface of the insulating sheet 2, i.e. the surface opposite to the surface formed with the control electrode 4. The coating layers 7 are formed on the insulating sheet 2 at at least portions that contact the toner 16 carried by the toner carrying roller 14 at upstream and downstream sides of the apertures 6 in the transport direction of toner 16. Coating layers 7 can be a film, obtained by dispersing conductive finely divided particles of carbon, aluminum, molybdenum, nickel, and chromium, used as an antistatic member, and oxide finely divided particles of silicon oxide, aluminum, titanium oxide, zinc oxide, magnesium oxide, used as a flow enhancer, into a binder of organic resins, such as epoxy resin, polyimide resin, preferably, polyimide resin, to obtain a coating. The coating layers 7 are applied to the insulating sheet 2 to obtain a film. The insulating sheet 2 with coating layers 7 is baked and sets for a few minutes in an atmosphere of 300° C. or below, preferably, in an atmosphere of 200° C. to 280° C.

Figure 4:
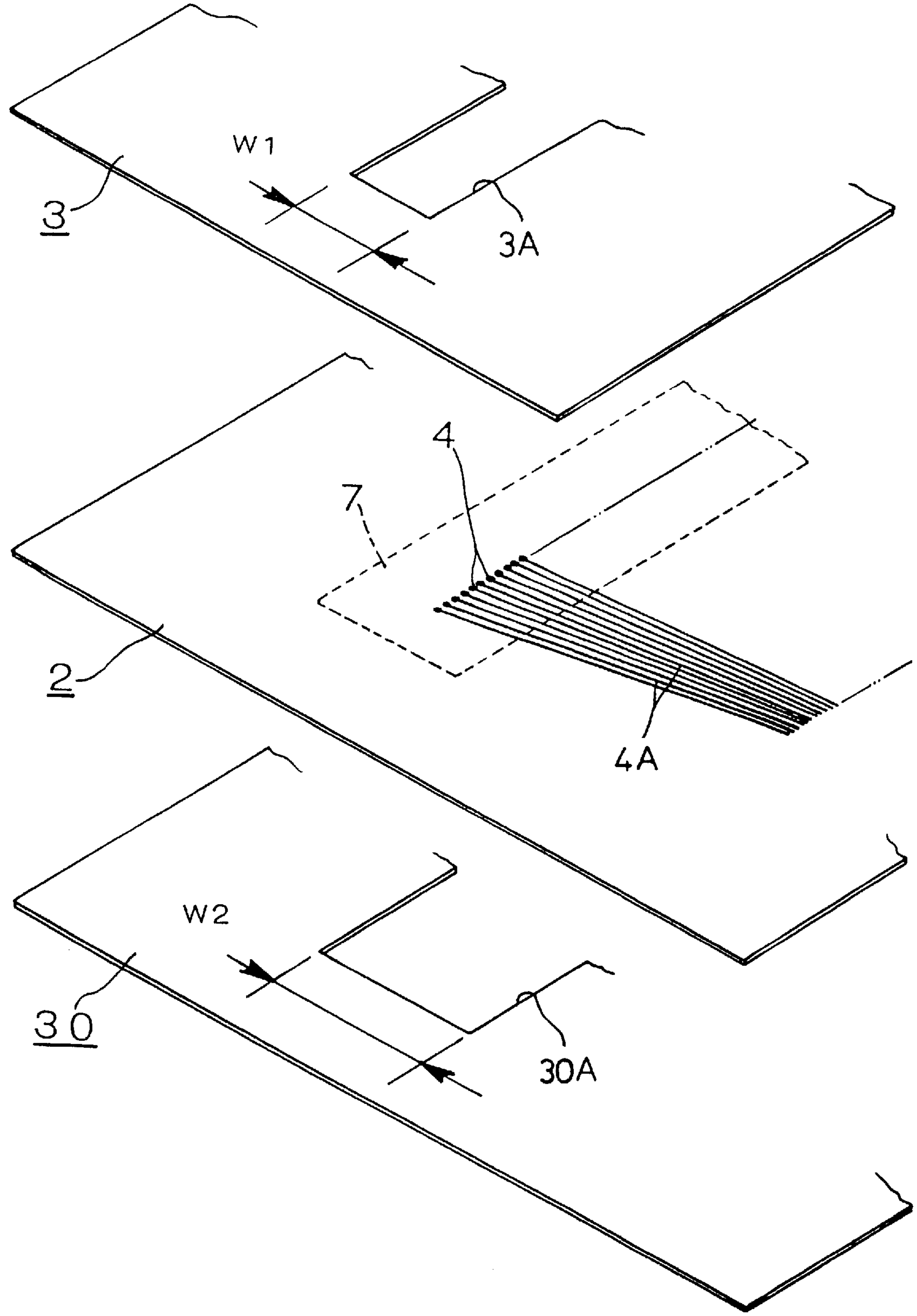
FIG. 4 is an exploded perspective view of the aperture electrode body according to the first preferred embodiment of the invention.

As shown in FIG. 4, reinforcing resin sheets 3 and 30 are affixed over the upper and lower surfaces of the insulating sheet 2 as reinforcing members. The reinforcing resin sheet 3 formed from a resin film made of polyimide resin having the same or substantially the same thickness as the insulating sheet 2. The reinforcing resin sheet 3 is joined to the upper surface of the insulating sheet 2, except at the peripheral areas of the aperture 6 and the end edge portion, where the driving IC 5 is mounted. The reinforcing resin sheet 30 formed from a resin film made of polyimide having the same or substantially the same thickness as the insulating sheet 2. The reinforcing resin sheet 30 is joined to the lower surface of the insulating sheet 2, except at a portion that is in contact with the toner carrying roller 14, i.e. a portion formed with the coating layer 7, through the toner layer.

As shown in FIG. 4, a notch portion 3A is provided in the reinforcing resin sheet 3 to avoid the periphery of aperture 6, and has width W1 in the order of about 5 mm. In the reinforcing resin sheet 30, a notch portion 30A is provided to avoid the portion in contact with the toner carrying roller 14, i.e. a portion formed with the coating layer 7, and has a width W2 in the order of about 10 mm. By use of notch portions 3A and 30A, the reinforcing resin sheets 3 and 30 reinforce the strength of the aperture electrode body 1, without adversely affecting the toner flow control of the aperture electrode body 1. Each notch 3A and 30A is located on the electrode body in a spaced relation from the control electrodes 4. Therefore, at least the peripheries of the apertures of the control electrodes are not covered by the reinforcing sheets 3 and 30.

The reinforcing resin sheets 3 and 30 material is preferably the same as the insulating layer 2. More preferably, the film is provided by the same makers of the insulating layer 2. For example, if EUPYREX (Ube Industries, Ltd.) is employed as a polyimide resin film, the same EUPYREX is preferably used for the reinforcing resin sheets 3 and 30. The same is true where the polyimide products, such as KAPTON (TORAY DUPON INDUSTRIES, INC.), ESPANEX (Nippon Steel Chemical Co., Ltd.) and NEOFLEX (Mitsui Toatsu Chemicals, Inc.) are used.

The reinforcing resin sheets 3 and 30 preferably have the same thickness as the insulating sheet 2. However, where a higher strength is desired, or where the strength is not needed to be increased, a slight difference in thickness is acceptable. The reinforcing resin sheets 3 and 30 are not limited to the resin films made of polyimide, but films having characteristics suitable for the reinforcing member, such films made of materials having substantially equal thermal expansion coefficients, such as, for example, resin films made of polyester, polyamide and polyethylene, may be used. Further, metal films, such as aluminum, copper and stainless steel, can be also used.

The reinforcing resin sheets 3 and 30 are joined to the insulating sheet 2 of the aperture electrode body 1 by adhesives, which are suitable for bonding the respective materials. For example, if the resin films are formed of polyimide, heat sensitive adhesives, i.e., hot melt adhesives may be used. Moreover, a thermal bonding process using a pressure sensitive hot melt adhesive can be used to affix the resin films with a good contact and sufficient bonding strength.

The reinforcing resin sheets 3 and 30 are bonded from both surfaces of the insulating sheet 2. Therefore, even if the materials of the reinforcing resin sheets 3 and 30 are different from the insulating sheet 2, it is possible to minimize any generated warp due to different characteristics, particularly, different thermal expansibilities. In particular, where the insulating sheet 2 and the reinforcing resin sheets 3, 30 are made from the same material, no partial strain occurs due to the different characteristics, thus good contact and with sufficient bonding strength can be achieved. Accordingly, it is possible to improve the strength of the aperture electrode body 1 and warp seldom occurs.

Where metal, such as aluminum, copper or stainless steel, is used for the reinforcing resin sheets 3 and 30, the lead wire portion 4A for connecting the control electrode 4 and the driving IC 5 can be short-circuited by the reinforcing resin sheet. However, if an adhesive having insulative properties is used, the insulating properties between the lead wire portion 4A and the reinforcing resin sheet 3 can be maintained.

As shown in FIG. 1, the aperture electrode body 1 is mounted on the upper mounting portion of the toner casing 11 by suitable means, such as for example, tightening screws (not shown). The lower surface of the coating layer 7 contacts with the toner carrying roller 14 where the control electrode 4 on the opposite side of the recording medium 2.

The relationship between the apertures 6 of the aperture electrode body 1 and the toner carrying roller 14 will now be described in detail. As shown in FIG. 1, each aperture 6 is arranged so the center of the aperture 6 passes through the uppermost portion of the peripheral surface of the toner carrying roller 14 and the center axis of the toner carrying roller 14. The apertures 6 are equally spaced to left and right with the uppermost portion of the peripheral surface of the toner carrying roller 14 serving as a center point. The toner 16 passing through the apertures 6 can be made constantly distributed over the entire area within the apertures 6. Further, since the wall surface of each aperture 6 is parallel to the jumping direction of the toner 16, it is possible to stably jump the toner.

The aperture electrode body 1 is pressed against the toner carrying roller 14 and flexed upwardly in the transporting direction by an angle, for example approximately 3 degrees, to upstream and downstream sides of the recording medium 20 about the row of the apertures 6. Therefore, it is possible to increase a contact area between the aperture electrode body 1 and the toner carrying roller 14, and to minimize an unevenness of concentration of toner, because the lower peripheries of the apertures 6 can be equally pressed to left and right sides.

A control voltage applying circuit 8 for applying a control voltage through the driving IC 5 is connected between the control electrode 4 and the toner carrying roller 14. The control voltage applying circuit 8 applies a positive voltage on the order of about +50 V to the control electrodes 4 corresponding to the image portion, and applies a negative voltage of the order of −20 V to −50 V to the control electrodes 4 corresponding to the non-image portion. The voltages are applied in accordance with an image signal and in coordination with the rotation of the back electrode roller 22. That is, when the control of toner jumping for one dot row portion onto the recording medium 20 is completed by the rotation of the back electrode roller 22, the control of toner jumping for next dot row portion is then performed. A DC high voltage power source 24 is connected between the back electrode roller 22 and the toner carrying roller 14 is connected so a high voltage, of the order of about +1 kV, may be applied to the back electrode roller 22.

The operation of the above image forming apparatus constructed above will now be described below.

The toner carrying roller 14 and the supply roller 12 are rotated in the directions as indicated by the arrows in FIG. 1. The toner 16 is fed from the supply roller 12 and rubbed against the toner carrying roller 14 by the toner layer regulating blade 18 to form a thinner layer. The toner layer regulating blade 18 also imparts a charge to the thin layer of toner in a predetermined polarity, for example, a negative polarity. The toner 16 is carried as a thin toner layer having an even thickness to the toner carrying roller 14.

The toner 16 on the toner carrying roller 14 is then transported toward the aperture electrode body 1 when the carrying roller 14 rotates. The toner 16 is supplied to the apertures 6 where the aperture electrode body 1 contacts with the toner carrying roller 14. Thereby, the toner on the carrying roller 14 has a weakened bonding force, thus enabling the control of a toner flow with a low voltage. That is, the aperture electrode body 1 contacts the toner 16 on the toner carrying roller 14, i.e. the toner 16 contacts with the aperture electrode body 1 in the vicinity of the apertures 6. Thus, the toner particles roll onto the carrying roller 14 enabling the disengagement from the toner carrying roller 14 using a control voltage.

Thus, when the bonding force of the toner 16 with the toner carrying roller 14 is sufficiently weakened, the charged toner 16, which is supplied through the apertures 6 of the aperture electrode body 1, is controlled to jump in accordance with the image signal. When a positive voltage of +50 V is applied through the driving IC 5 from the control voltage applying circuit 8 to the control electrode 4, an electric force from the control electrode 4 toward the toner carrying roller 14 is generated due to a difference in potential between the control electrode 4 and the toner carrying roller 14 in the vicinity of the apertures 6 that correspond to the control electrode 4. Thereby, negatively charged toner 16, receives an electrostatic force in a direction where the potential is high, passes through the apertures 6 from the top of the toner carrying roller 14, and is drawn to a side of the control electrode 4. The drawn toner 16 further jumps toward the recording medium 20 from the force of the electric field between the recording medium 20 and the aperture electrode body 1, with the assistance of a high voltage of +1 kV applied to the back electrode roller 22. The toner 16 then accumulates on the medium 20 to form a dot-like picture element.

A voltage of about 0 V or about −20 V to −50 V is applied through the driving IC 5 from the control voltage applying circuit 8 to the control electrode 4 that corresponds to a non-image portion. Thus, an electric field from the non-image portion control electrode 4 toward the toner carrying roller 14 will not be formed. The toner does not pass through the apertures 6 of these control electrodes 4 and jumping of toner does not occur at these control electrodes 4. Where a negative voltage of the order of −20 V to −50 V is applied, the applied voltage is lower than the toner carrying roller 14. Therefore, a reversed electric field, compared to the electric field corresponding to the image portion is generated, to further suppress the jumping of toner 16. Thus, a clearer image with less fog can be formed.

The recording medium 20 is transported through the clearance between the aperture electrode body 1 and the back electrode roller 22. The medium 20 is fed by one picture element, in a direction perpendicular to the row of the apertures 6, when a picture element for one row is formed by the toner 16. The above-described process is repeated to form a toner image over the entire surface of the recording medium 20. Thereafter, the toner image formed on the recording medium 20 is fixed on the recording medium 20 by the thermal fixing device 26.

The coating layer 7 in the aperture electrode body 1 is formed on at least a portion that contacts the toner particles, i.e. the lower surface side of the insulating sheet 2 in the vicinity of the aperture 6. Thus, the toner 16, which is transported to the aperture electrode body 1 by the toner carrying roller 14, is smoothly moved without adhering to and remaining on the toner contact surface of the aperture electrode body 1. Flow of the finely divided oxide particles can be improved, for example by silicon oxide that constitutes a flow improving agent in the coating layer 7.

The coating layer 7 may also contain conductive finely divided particles, for example carbon, as an antistatic agent to achieve an antistatic function. Therefore, the coating layer 7 is not charged by sliding contact with the toner carrying roller 14 or the toner particles. Accordingly, a surplus electrostatic force is not applied to the transported toner 16. The transporting charged particles of toner 16 is very smooth at the contact surface between the aperture electrode body 1 and the toner carrying roller 14. The flow is not partly delayed, and unevenness does not occur. Thus, there is no problem in the amount of toner particles supplied, as the toner is rarely supplied to another aperture 6. Therefore, it is possible to record an image of high quality, without lateral unevenness in the output image.

Further, since the reinforcing resin sheets 3 and 30 are integrally affixed to both upper and lower surfaces of the aperture electrode body 1, the aperture electrode body 1 exhibits a sufficient strength. Accordingly, warp generated because of a difference of the bonded materials, particularly, warp in the vertical on direction of contact between the aperture electrode body 1 and the toner carrying roller 14 can be minimized. Thus, the contact between the coating layer 7 of the aperture electrode body 1 and the toner carrying roller 14 is uniform at the apertures 6, and the toner particles can be stably and smoothly supplied to the recording medium 20.

Accordingly, a large warp does not occur in the aperture electrode body 1, even where the reinforcing member, such as a resin film, is bonded to only one surface of the aperture electrode body 1. Therefore, the contact is uniform, and the flow of the toner 16 is not impeded. The toner particles are uniformly and smoothly transported. Toner flow control can be obtained under the ideal electrical and mechanical conditions to obtain an image of high quality, without unevenness.

If an insulating toner is used as the toner 16, the insulating properties between the toner carrying roller 14 and the control electrode 4 are further enhanced. There will be no possible erroneous insulation breakage in the apertures 6.

Even where the toner 16 is not present on the toner carrying roller 14 due to a problem of a toner supply system, the insulating properties between the control electrode 4 and the toner carrying roller 14 are maintained because of the insulating sheet 2 of the aperture electrode body 1. Therefore, the control electrode 4 and the toner carrying roller 14 cannot be erroneously electrically short-circuited, and a circuit element for the driving IC will not be broken.

Figure 5:
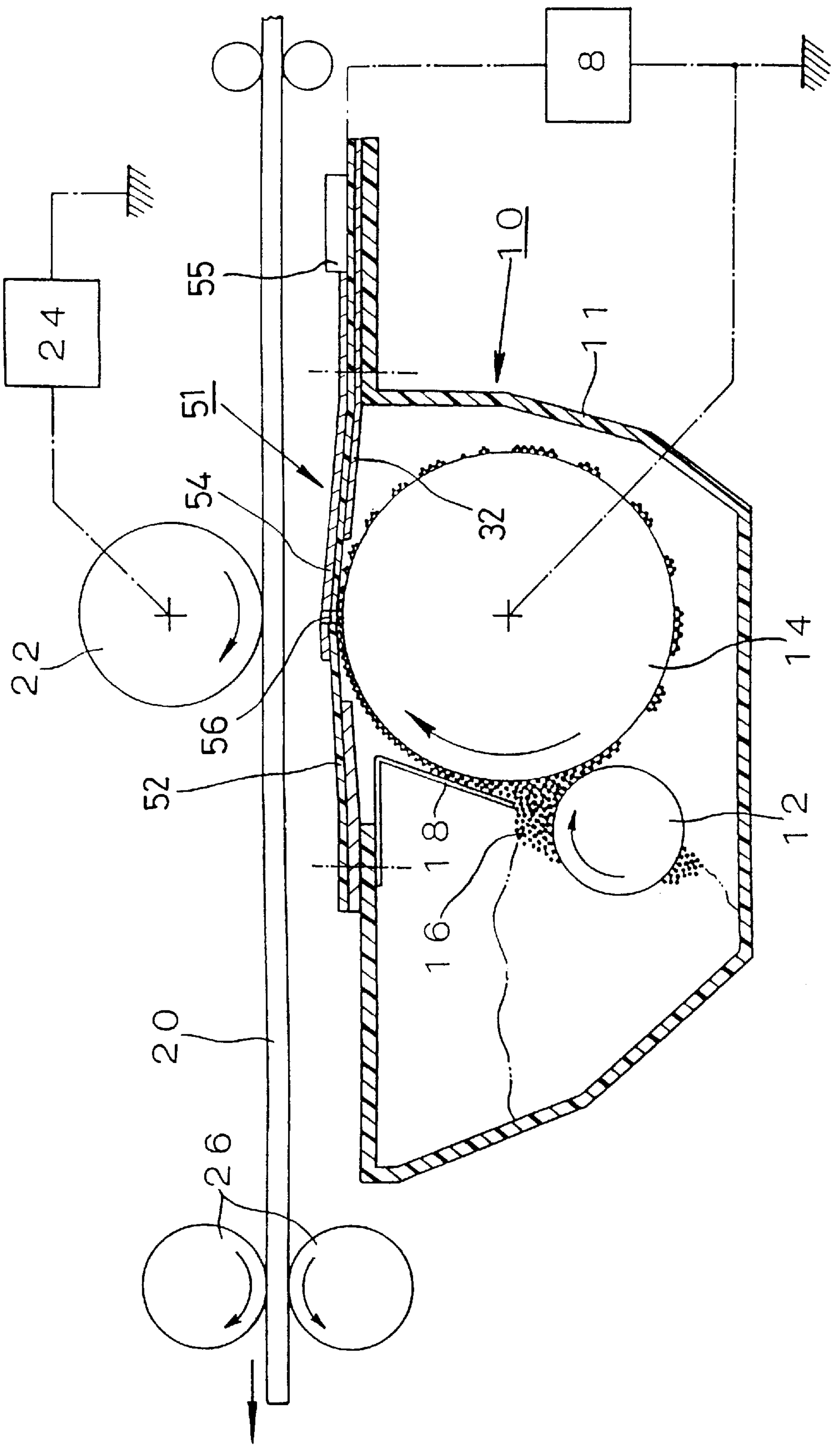
FIG. 5 is a schematic structural view showing a second preferred embodiment of an image forming apparatus according to the invention.

A second preferred embodiment the invention is will now be described with reference to FIGS. 5–9. FIG. 5 is a schematic view of the second preferred embodiment of the image forming apparatus according to the present invention. Similar elements of the second preferred embodiment are illustrated with like reference characters. A back electrode roller 22 is rotatably disposed on a chassis (not shown) with a suitable clearance of about 1 mm above an aperture electrode body 51. Thus, a sheet of paper used as a recording medium 20 can be inserted into the clearance for transportation. A toner supply device 10 is used as charged particle supply means and is disposed lengthwise along and below the aperture electrode body 51. A fixing device 26 is disposed ahead of the paper 20 that is transported by the back electrode roller 22.

The above-described elements will now be described in detail. The toner supply device 10 is composed of a toner casing 11 in combination with a housing for the entire apparatus, including toner 16 in the form of charged particles, a supply roller 12, a toner carrying roller 14 functioning as a charged particle holding roller, and a toner layer regulating blade 18. The toner carrying roller 14 carries the toner 16 toward the aperture electrode body 51. The supply roller 12 supplies the toner 16 toward the toner carrying roller 14.

The supply roller 12 and the toner carrying roller 14 are supported on the toner casing 11 and rotate in the directions indicated by the arrows. Both the elements are disposed parallel to each other and in contact. The toner layer regulating blade 18 regulates the amount of the toner 16 carried to the toner carrying roller 14. The toner 16 is uniformly distributed on the surface of the roller 14 and uniformly charged. The blade 18 is pressed against the toner carrying roller 14.

Figure 6:
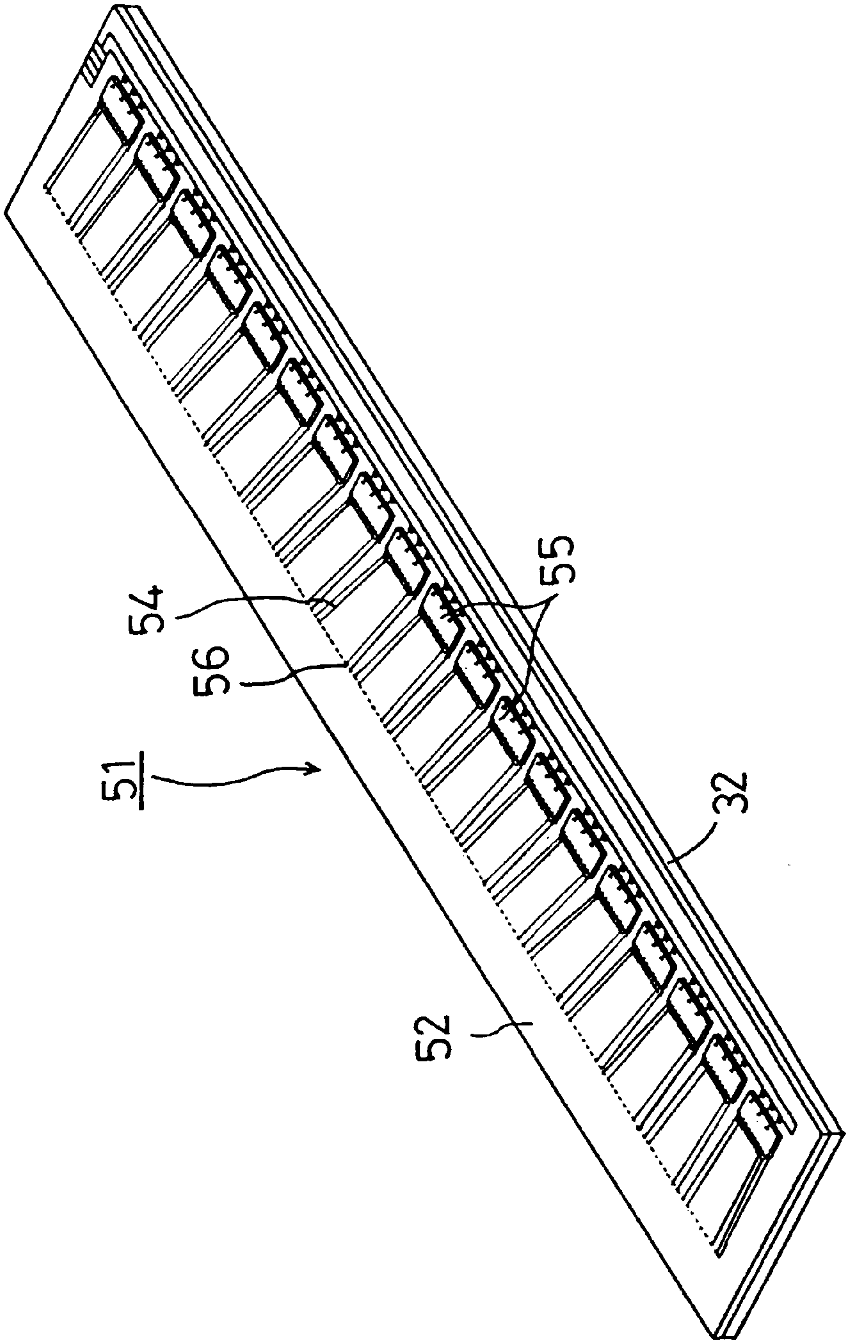
FIG. 6 is a perspective view illustrating an upper surface of an aperture electrode body mounted on the image forming apparatus of in FIG. 5.
Figure 7:
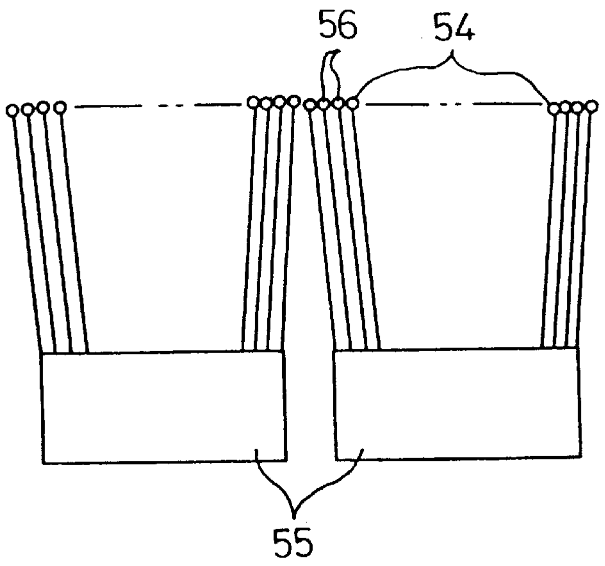
FIG. 7 is an explanatory view illustrating a relationship between control electrodes on the aperture electrode body and a driving IC.

In the aperture electrode body 51, as shown in FIGS. 6 and 7, a plurality of apertures 56 having a suitable diameter for example about 100 $\mu$m, are formed in a row in an insulating sheet 52. The sheet 52 is made of a suitable material, such as polyimide and has a thickness of about 25 $\mu$m. A control electrode 54 is made of a suitable material copper and has a thickness of about 1 $\mu$m. Each control electrode 54 is formed on the upper surface of the insulating sheet 52, which includes an electrode 54 corresponding to each aperture 56. The aperture electrode body 51 is pressed against the toner carrying roller 14 at an aperture position of the insulating sheet 52 where the control electrode 54 is opposed to the sheet 20, as shown in FIG. 5. The number of control electrodes can be any appropriate number to accomplish suitable printing. The number of control electrodes shown in the figures is merely exemplary and is not meant to be limiting. A plurality of driving IC 55 are mounted on the upper surface of the insulating sheet 52. The driving IC 55 comprise terminals connected with the plurality of control electrodes 54 on the upper surface of the insulating sheet 52.

Figure 8:
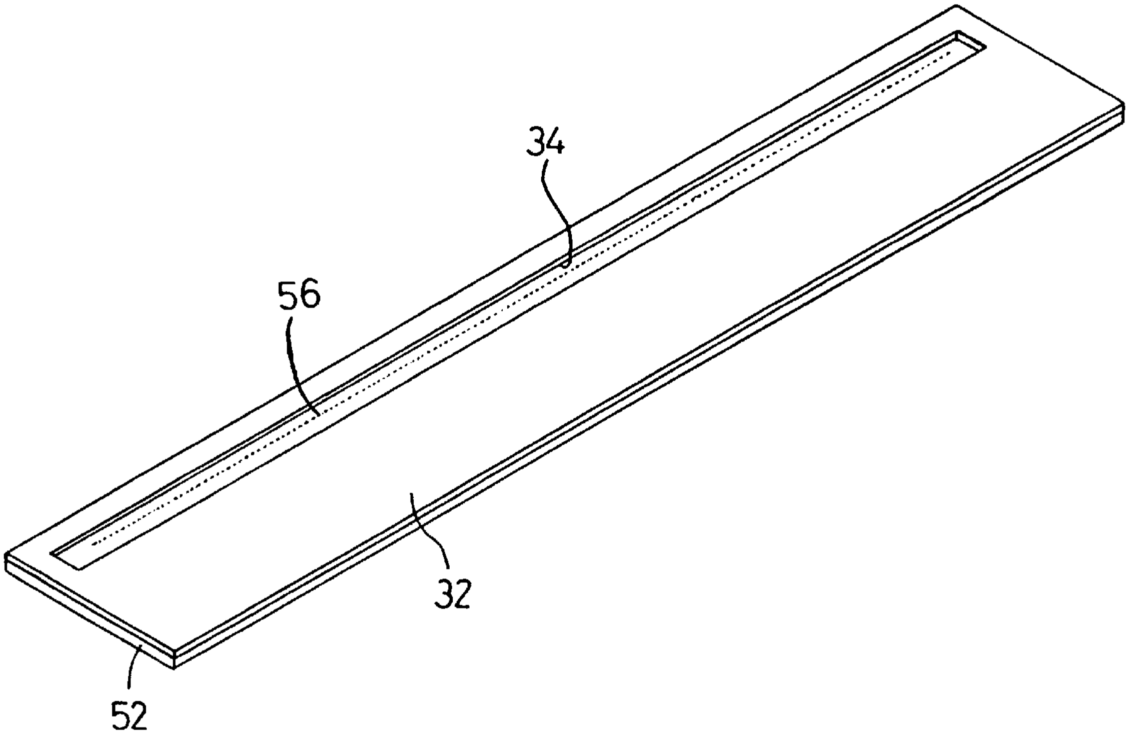
FIG. 8 is a perspective view illustrating a lower surface of the aperture electrode body.

As shown in FIGS. 6 and 8, a reinforcement member 32 made of a suitable material, such as copper, having a suitable thickness of about 1 $\mu$m, is formed on the lower surface of the insulating sheet 52, except at the peripheries of the apertures 56. The reinforcement member 32 is formed with an opening 34 at portions corresponding to each aperture 56, where the insulating sheet 52 is uncovered.

The process for producing the aperture electrode body 51 will now be described. First, copper films are formed over both surfaces of the insulating sheet 52 and are subjected to an etching processing to form the control electrode 54 and the reinforcement member 32 into a desired shape. The control electrode 54 has its center bored with a hole to form the aperture 56. Each driving IC 55 is then mounted with terminals are connected to the control electrodes 54.

On the aperture electrode body 51, the copper films are arranged on the greater part of both surfaces of the insulating sheet 52. Therefore, less strain occurs in the materials, and less warp occurs in the aperture electrode body 51. Further, during the etching processing, even if the control electrode 54 produces a localized strain, the rigidity can be enhanced to suppress localized deformation, since the reinforcement member 32 is arranged on the back of the aperture electrode body 51.

The process results in the aperture electrode body 51 having a high rigidity. The productivity is excellent and a lower cost can be achieved because of the improved locating accuracy and mounting properties used in the process of boring the apertures 56 and in the steps of mounting the driving IC 55 the stabilization of contact between the toner carrying roller 14 and the aperture electrode body 51. These are important to obtain good recording. Therefore, it is possible to form an image, which has an excellent image quality.

Figure 9:
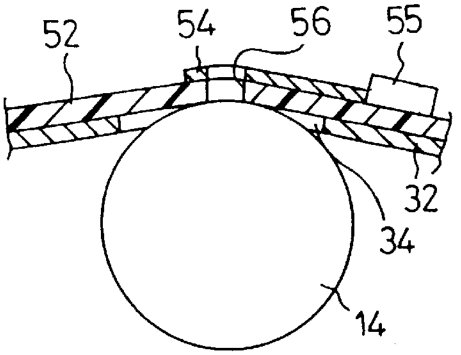
FIG. 9 is a view schematically illustrating the aperture electrode body and a toner carrying roller used in the image forming apparatus shown in FIG. 5.

The relationship between the apertures 56 of the aperture electrode body 51, the reinforcement member 32 and the toner carrying roller 14 will be described in detail. As shown in FIG. 9, each aperture 56 is arranged so its center passes through the uppermost portion of the peripheral surface of the toner carrying roller 14 and the center axis of the toner carrying roller 14. The apertures 56 are arranged equally spaced to left and right with the uppermost portion of the peripheral surface of the toner carrying roller 14 serving as a center. Thereby, the distribution of toner 16 passing through the apertures 56 can be equal over the entire area within the apertures 56. Further, since an inner surface of the aperture 56 is parallel with the jumping direction of the toner 16, it is possible to stably jump the toner particles.

The reinforcement member 32 is formed with an opening 34 that does not contact the toner carrying roller 14. Accordingly, the toner carrying roller 14 directly contacts the insulating sheet 52.

A control voltage applying circuit 8 is connected between the control electrode 54 and the toner carrying roller 14 is connected. The control voltage applying circuit 8 applies a voltage of about 0 V or about +50 V to the control electrode 54, based on the image signal.

A DC power source 24 is connected between the back electrode roller 22. This DC power source applies a voltage of about 1 kV to the back electrode roller 22.

The reinforcement member 32 is formed from a copper foil that is the same as the copper foil used for the control electrode 54. It has the same thickness as the control electrodes 54. Thus, the forces applied to both surfaces of the aperture electrode body 51 can be the same to further prevent deformation or creases in the aperture electrode body 51.

Further, since the reinforcement member 32 does not contact the toner carrying roller 14, even if the reinforcement member 32 is energized due to troubles such as dust, the reinforcement member 32 does not short-circuit with the toner carrying roller 14. Thus, the distance between the control electrode 54 and the toner carrying roller 14 can be shortened to decrease the voltage applied to the control electrode 54 and the back electrode roller 22. Moreover, less inexpensive driving elements can be used in this arrangement.

The operation of the second preferred embodiment is similar to that of the first preferred embodiment, and accordingly will be omitted.

Since the reinforcement member 32 comprises an opening 34 corresponding to the control electrode 54, that portion of the reinforcement member 32 can be thin to facilitate boring of the apertures 56. Moreover, since the control field of the control electrode 54 is generated between the control electrode 54, the interior of the aperture 56 and the toner carrying surface of the toner carrying roller 14 the control field can be directly applied to the toner 16. Thus, a good control efficiency can be achieved.

Further, even if the toner 16 receives a force due to the sliding movement with the aperture electrode body 51 and moves into the aperture 56 corresponding to a non-image portion, the control can prevent the toner from passing through the aperture 56 by the electric field within the aperture 56. Thus, good control of toner flow can be achieved.

Further, the insulating sheet 52 of the aperture electrode body 51 is directed at the toner carrying roller 14. Even where toner 16 is not the toner carrying roller 14, due to the problems in the toner supply system, the driving elements do not break because of electric short-circuiting between the control electrode 54 and the toner carrying roller 14.

The aperture electrode body 51 contacts the toner 16 on the toner carrying roller 14 at an inlet of the aperture 56. Thereby, any toner 16 that has accumulated on the inlet of the aperture 56 is carried away by the toner 16 that is subsequently supplied by the toner carrying roller 14. Therefore, the toner 16 does not accumulate and clump to block the apertures 56.

The invention is not limited to the described preferred embodiments. Various modifications can be made within the scope of the invention without departing from the subject matter of the invention.

The reinforcing resin sheet 3 provided on the upper surface of the insulating sheet 2 in the first preferred embodiment may be of a rigid insulating material, such as alumina, zirconia, glass, silicon carbide, or ceramic materials, such as silicon nitride, having a thickness of about 100 μm, and a laminated epoxy sheet. If a thin and hard material is used, the reinforcing resin sheet 3 may be provided on only the upper surface of the insulating sheet 2.

Figure 10:
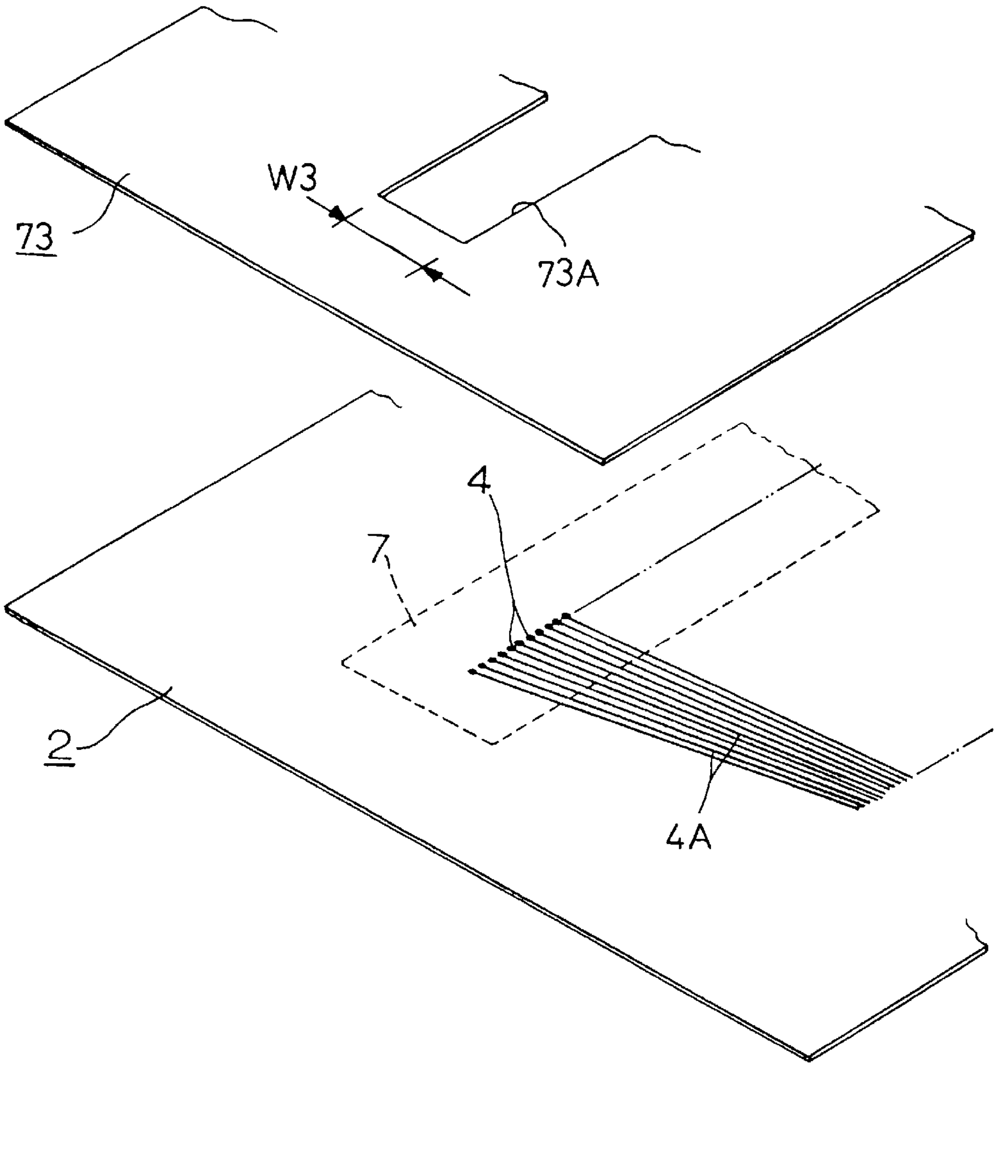
FIG. 10 is an exploded perspective view of the aperture electrode body according to a modification of the preferred embodiments of the invention.
Figure 11:
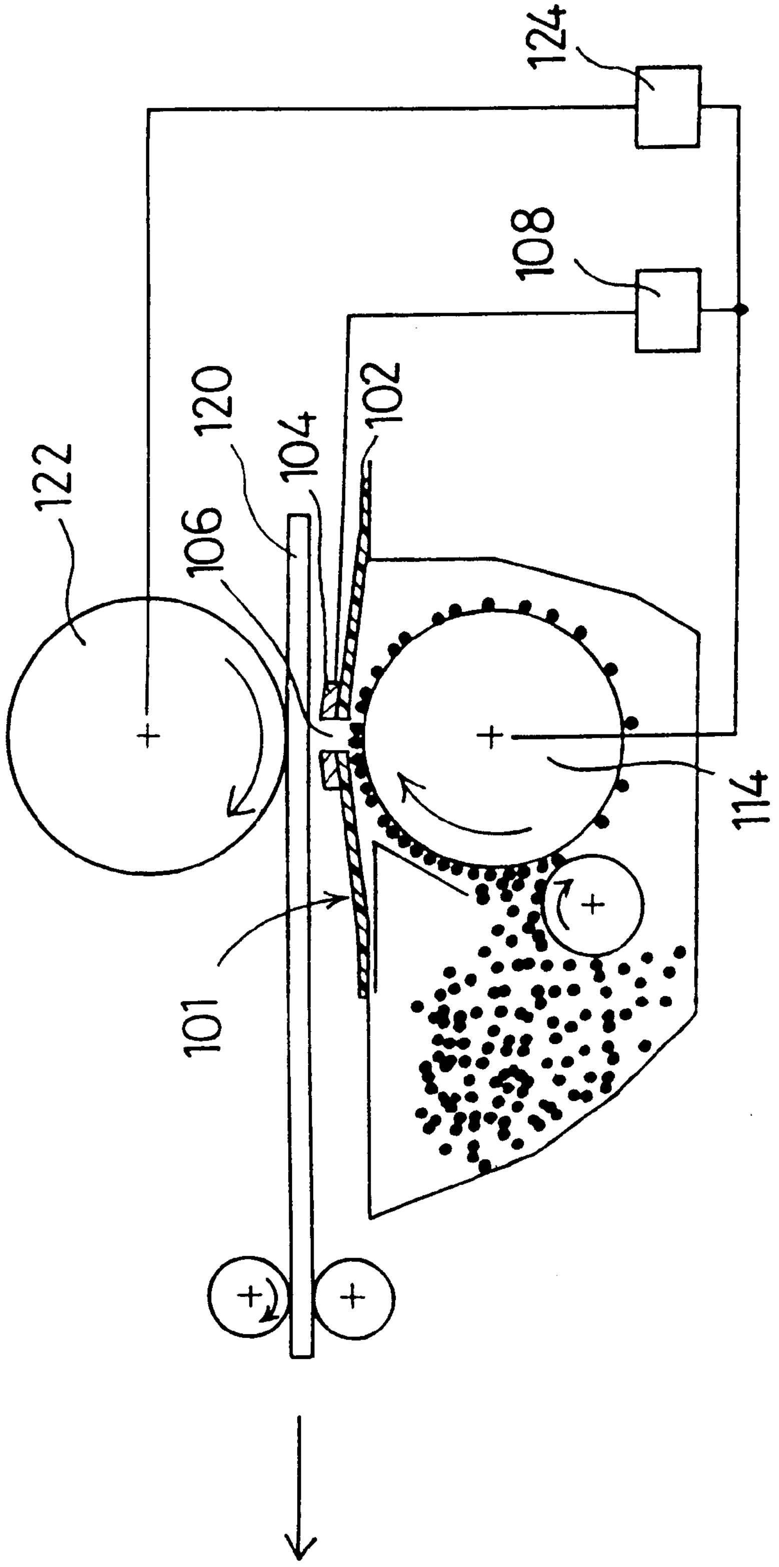
Fig. 11 PRIOR ART
FIG. 11 is a view illustrating the construction of a conventional image forming apparatus.
Figure 12:
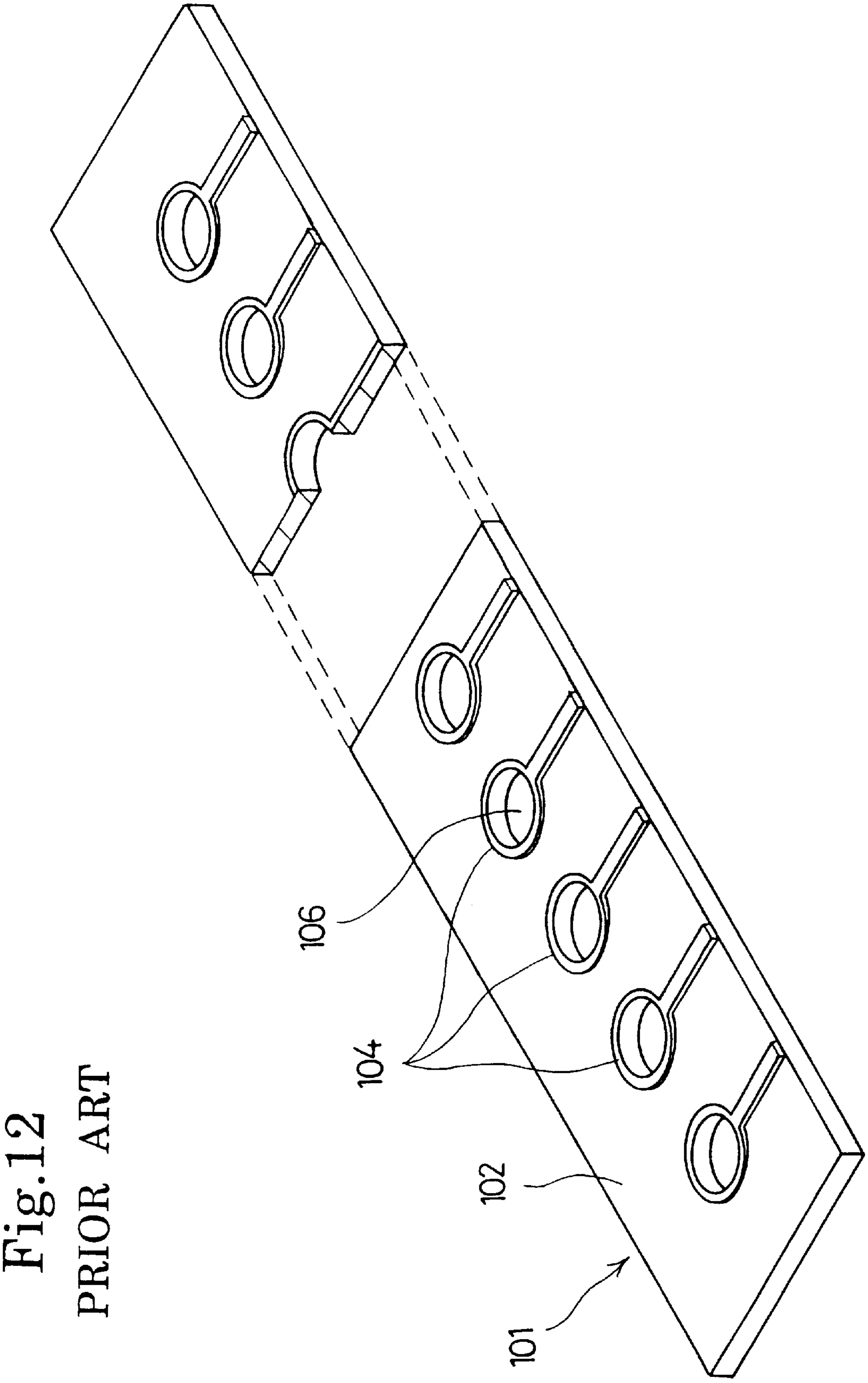
Fig.12 PRIOR ART
FIG. 12 is a perspective view illustrating the details of an upper surface of an aperture electrode body mounted on the conventional image forming apparatus of FIG. 11.
Figure 13A:
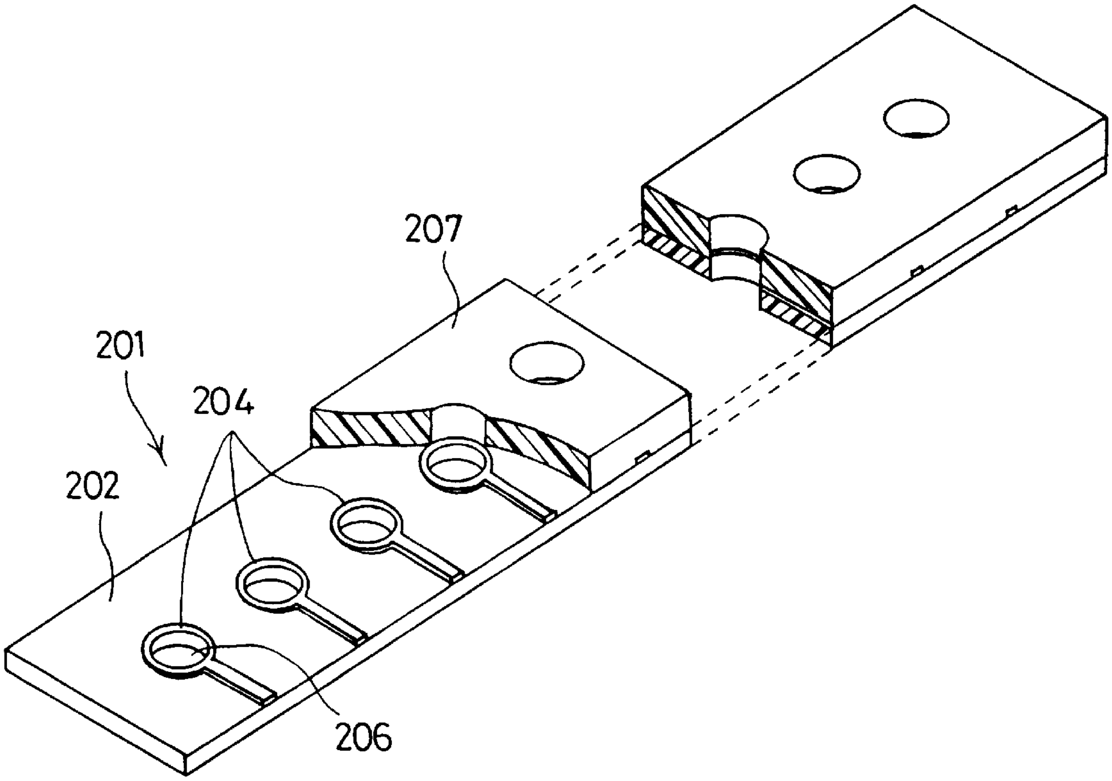
Fig.13 A PRIOR ART
FIG. 13A is a perspective view illustrating the aperture electrode body mounted on the conventional image forming apparatus.
Figure 13B:
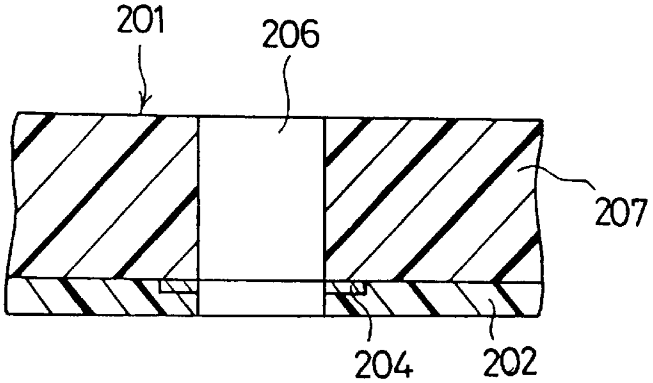
Fig.13 B PRIOR ART
FIG. 13B is a sectional view illustrating the aperture electrode body mounted on the conventional image forming apparatus.

For example, FIG. 10 illustrates a modification of the preferred embodiments. Similar elements of the modification are illustrated using like reference characters. In FIG. 10, a reinforcing member 73 is positioned on the upper side surface of the insulating sheet 2 of the electrode control body, i.e., on the side of the electrode control body opposite the toner carrying roller 14. The reinforcing member 73 is formed with a notch 73A, which can be positioned over the control electrodes 4 permitting the peripheries of the apertures in the control electrodes 4 to be uncovered. In other words, the width W3 between edges of the notch 73A is such that the edges do not contact the peripheries of the control electrodes 4 and leave the peripheries exposed. The width W3 of notch 73A can be any appropriate width as long as it exposes the peripheries of the apertures and provides strength to the electrode control body.

The operation, construction and process for producing the modification of FIG. 10 is substantially similar to the preferred embodiments. However, the reinforcing member 73 is positioned on the upper surface of the insulating sheet 2 of the electrode control body 1. Accordingly, a further description of the modification is omitted.

Accordingly, the reinforcement member can be provided on the upper surface of the insulating sheet 2 closer to the opening 6 as compared with the lower surface to effectively reinforce the aperture electrode body 1. If it is a material thinner than about 100 μm, the distance between the recording medium 20 and the aperture electrode body 1 is not relatively wide, and the toner 16 that has passed through the opening 6 of the aperture electrode body 1 can be positively recorded on the recording medium 20.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image forming apparatus comprising:

an electrode body comprising a plurality of apertures and a plurality of control electrodes corresponding to the plurality of apertures;

supply means for supplying charged particles to the plurality of apertures of said electrode body; and control electrode driving means for independently controlling the plurality of control electrodes of said electrode body to allow charged particles to pass through the plurality of apertures of the electrode body from the supply means and selectively jump the charged particles onto a recording medium;

said electrode body further comprising:

an insulating member provided with the plurality of apertures to control a flow of charged particles; and at least one reinforcing member formed on at least one surface of said insulating member, except at peripheries of said plurality of apertures.

2. The image forming apparatus as claimed in claim 1, wherein said at least one reinforcing member is formed on the surface that said plurality of control electrodes on said insulating member are provided.

3. The image forming apparatus as claimed in claim 1, wherein said at least one reinforcing member is formed on a surface opposite the surface that said plurality of control electrodes on said insulating member are provided.

4. The image forming apparatus as claimed in claim 1, wherein the at least one reinforcing member includes a first member formed on one surface of the insulating member and a second member formed on an opposite surface of the insulating member.

5. The image forming apparatus as claimed in claim 1, wherein said at least one reinforcing member is formed from a material selected from the group comprising alumina, zirconia, glass, silicon carbide, silicon nitride, a ceramic material, and a laminated epoxy sheet.

6. The image forming apparatus as claimed in claim 1, wherein said at least one reinforcing member has a thickness of about 100 μm or less.

7. The image forming apparatus as claimed in claim 1, wherein said at least one reinforcing member is adhered to said insulating member with a heat sensitive adhesive.

8. The image forming apparatus as claimed in claim 1, wherein said at least one reinforcing member has substantially the same thickness as each electrode of said plurality of control electrodes.

9. The image forming apparatus as claimed in claim 1, wherein said at least one reinforcing member is formed of the same material as each electrode of said plurality of control electrodes.

10. The image forming apparatus as claimed in claim 1, wherein said charged particle supply means comprises a charged particle holding roller that can contact with said electrode body, and said at least one reinforcing member is positioned on a side of the charged particle holding roller that the electrode body is positioned and does not contact the charged particle holding roller.

11. The image forming apparatus as claimed in claim 1, wherein said at least one reinforcing member is formed of a material having substantially the same thermal expansion as said insulating member and is adhered to said insulating member with a heat sensitive adhesive.

12. The image forming apparatus as claimed in claim 1, wherein said at least one reinforcing member is formed of the same material as said insulating member.

13. The image forming apparatus as claimed in claim 1, wherein said at least one reinforcing member has substantially the same thickness as said insulating member.

14. The image forming apparatus as claimed in claim 1, wherein said at least one reinforcing member is a resin film.

15. The image forming apparatus as claimed in claim 14, wherein said resin film selected from the group comprising polyester, polyimide, polyamide and polyethylene.

16. The image forming apparatus as claimed in claim 1, wherein said at least one reinforcing member is a metal film the metal is selected from the group comprising aluminum, copper and stainless steel.

17. The image forming apparatus as claimed in claim 1, wherein said at least one reinforcing member includes at least one slit-like notch portion the at least one slit-like notch portion corresponds to the peripheries of said plurality of apertures of said insulating member and is spaced from the periphery of each of said plurality of apertures.

18. The image forming apparatus as claimed in claim 17, wherein said at least one notch portion of said holding member on the surface of said insulating member on the said at least one control electrode has a width less than a width of the notch portion of said at least one reinforcing member on the surface of said insulating member opposite the at least one control electrode.

19. The image forming apparatus of claim 1, said electrode body further comprises at least one coating layer formed on a surface of the electrode body facing said supply means.

20. The image forming apparatus of claim 19, wherein the at least one coating layer includes at least one of a flow improving agent and an antistatic agent.

21. A method for forming an aperture electrode body, comprising:

providing a plurality of electrodes on an insulating film;

forming a plurality of apertures in the insulating film, wherein the plurality of apertures correspond to the plurality of electrodes; and adhering at least one reinforcing member to at least one surface of the insulating film on which said plurality of electrodes and said plurality of apertures are formed except at peripheries of said plurality of apertures, wherein at least one slit-like notch portion is formed in said at least one reinforcing member at portions corresponding to peripheries of said plurality of apertures.

22. The method as claimed in claim 21, further including forming said at least one reinforcing member on a surface of said plurality of electrodes of said insulating film.

23. The method as claimed in claim 21, further comprising selecting a material for said at least one reinforcing member from the group comprising alumina, zirconia, glass, silicon carbide, a ceramic material, silicon nitride, and a laminated epoxy sheet.

24. The method as claimed in claim 21, further comprising forming said at least one reinforcing member on a surface of said insulating film opposite to a surface which said plurality electrodes of said insulating film are provided.

25. The method as claimed in claim 21, further comprising forming said at least one reinforcing member with substantially the same thickness as each electrode of said plurality of electrodes.

26. The method as claimed in claim 21, further comprising forming said at least one reinforcing member of the same material as said plurality of electrodes.

27. The method as claimed in claim 21, further comprising forming said at least one reinforcing member on both surfaces of said insulating film.

28. The method as claimed in claim 21, further comprising forming said at least one reinforcing member from a material having substantially the same thermal expansion coefficient as said insulating film and adhering to said insulating film with a heat sensitive adhesive.

* * * * *